Dec. 7, 1965    R. MAIER    3,221,611

MULTIPART PISTON FOR INTERNAL COMBUSTION ENGINE

Filed June 10, 1964

INVENTOR
Rudolf MAIER by Bailey, Stephens & Huettig
ATTORNEYS ns in the bolts.
The object of this invention is to produce a bolting arrangement which is reliable in spite of a restricted structural length of the bolt and which can be substituted for the heretofore used necked-down bolts threaded into blind bores in the piston body and held by thrust sleeves.

In this invention, the bolt has bolt heads at each end of the shank, with the lower bolt head held against a thrust sleeve in the blind bore in the piston body and the upper bolt head tightly held by means of pressure elements, such as balls, against exteriorly threaded sockets positioned in the piston head. These sockets are movable in the direction paralleling the longitudinal axis of the piston but are secured against rotation. The internal diameter of the socket is larger than the diameter of the upper bolt head. Nuts threaded on the socket have a shoulder which bears against a corresponding shoulder in the cylinder head so that when the nut is turned down the socket is drawn upwardly to place the bolt under tension.

This construction has the advantage in that approximately the entire existing structural length of the bolt can be used as expansion length because the bolt itself is not threaded and therefore can have over its entire length a correspondingly greater diameter which, in turn, corresponds to the cross-sectional area of a screw. The threads have been removed from the bolt and placed on the socket and nut, which together form the locking means. Since the sockets are not turnable, this has the further advantage in that the turning of the nut is not transferred to the bolt and the bolts are not subject to torque stresses. Also, transverse or bending stresses are avoided by providing balls as the bearing means for the bolt heads.

The means by which the objects of the invention are obtained are described more fully with reference to the accompanying drawings in which.

Figure 1:
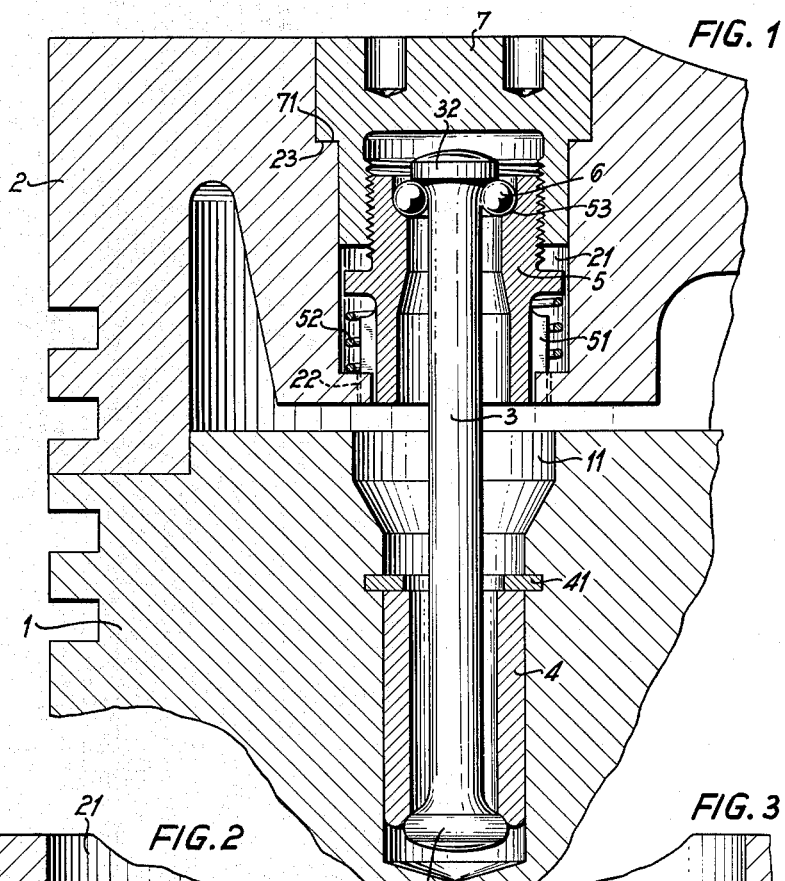
FIGURE 1 is a partial cross-sectional view through a piston showing the bolt construction of this invention.

As shown in FIGURE 1, the piston body 1 has a piston head 2 connected thereto by means of a bolt 3. The lower bolt head 31 bears against a thrust sleeve 4. A socket 5 in the piston head is used to hold the upper bolt head 32 through a pressure element such as balls 6. The socket 5 is exteriorly threaded and joined to a nut 7.

Thrust sleeve 4 is inserted in a blind bore 11 in the piston body 1, which bore 11 extends parallel to the longitudinal axis of the piston. The under surface of the lower bolt head 31 and the end of the sleeve 4 are curved or rounded off so that the bolt head is freely movable on the seat. Sleeve 4 is held in bore 11 by means of a snap ring 41. Alternately, sleeve 4 can be threaded into bore 11.

Piston head 2 has a recess 21 into which extends the upper head 32 of bolt 3. Socket 5 is positioned in recess 21 and is vertically movable but held against turning by means of the splines 51 between the socket and the piston head. Socket 5 is urged upwardly by spring 52. The upper end portion of the socket is exteriorly threaded. The interior diameter of socket 5 is larger than the diameter of bolt head 32 and bolt head 32 has a curved seat 53 for supporting the ball 6. The under surface of upper head 32 is correspondingly curved to bear against the opposite side of balls 6, which are pressure elements.

Figure 2:
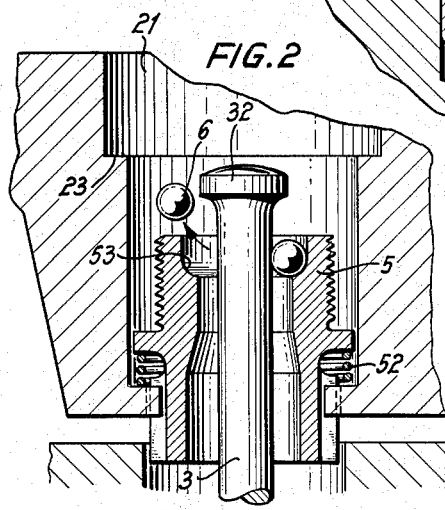
FIGURE 2 is a view similar to FIGURE 1 showing the bolt in partially assembled position.

The socket is threaded to nut 7, which nut has a shoulder 71 bearing against a corresponding shoulder 23 in the piston head. When nut 7 is tightened, the socket 5 is drawn upwardly to place bolt 3 under tension and force the piston head 2 against the piston body 1. To take off piston head 2, the nut 7 is unscrewed and, as shown in FIGURE 2, the socket 5 pressed downwardly against spring 52 so that the ball 6 can be removed. Socket 5 is then pulled out of the bore and the piston head removed from the piston body.

Figure 3:
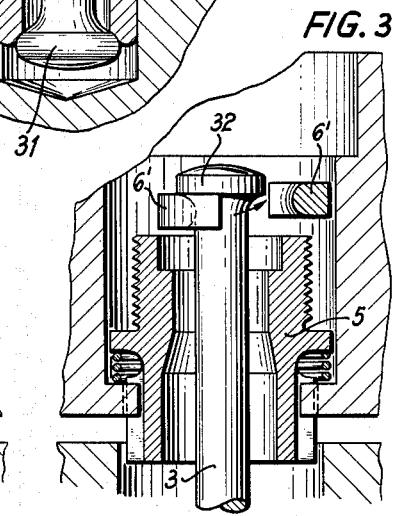
FIGURE 3 is a view similar to FIGURE 1 showing a modified form of the invention.

In the modification of FIGURE 3, semi-circular rings 6' are substituted for the balls 6 as the pressure elements.

Having now described the means by which the objects of the invention are obtained, I claim:

1. In an internal combustion engine piston having a piston head secured to the piston body by a plurality of bolts, the improvement in which each bolt has an upper bolt head and a lower bolt head, a bore in the piston body, thrust sleeve means in said bore for holding the lower bolt head, an exteriorly threaded socket in the piston head surrounding the upper bolt head, removable pressure elements mounted between said socket and said upper bolt head, spline means between said socket and piston head for preventing turning of said socket while permitting longitudinal movement of said socket, and nut means threaded to said socket and engaging said piston head for placing said bolt under tension.

2. In a piston as in claim 1, further comprising compression spring means between said socket and said piston head for urging said socket upwardly in said piston head.

3. In a piston as in claim 2, further comprising curved bearing surfaces between said upper bolt head, pressure elements and socket, and between said lower bolt head and said thrust sleeve.

References Cited by the Examiner
FOREIGN PATENTS
891,381   3/1962   Great Britain.

SAMUEL LEVINE, *Primary Examiner.*